(12) United States Patent
Müller et al.

(10) Patent No.: US 7,475,916 B2
(45) Date of Patent: Jan. 13, 2009

(54) DEVICE AND METHOD FOR COUPLING LINES TO FLUIDIC MICROSYSTEMS

(75) Inventors: Torsten Müller, Berlin (DE); Annette Pfennig, Berlin (DE); Stephen Shirley, Brandon (GB); Stefan Hummel, Haseldorf (DE); Martin Reichel, Neumünster (DE)

(73) Assignee: Perkinelmer Cellular Technologies, Hamburg (DE)

( * ) Notice: Subject to any disclaimer, the term of this patent is extended or adjusted under 35 U.S.C. 154(b) by 156 days.

(21) Appl. No.: 10/509,190

(22) PCT Filed: Mar. 25, 2003

(86) PCT No.: PCT/EP03/03092

§ 371 (c)(1),
(2), (4) Date: Aug. 9, 2005

(87) PCT Pub. No.: WO03/081113

PCT Pub. Date: Oct. 2, 2003

(65) Prior Publication Data

US 2006/0012167 A1    Jan. 19, 2006

(30) Foreign Application Priority Data

Mar. 25, 2002 (DE) ................................. 102 13 272

(51) Int. Cl.
*F16L 25/00* (2006.01)
*F16L 35/00* (2006.01)
(52) U.S. Cl. .............. 285/332.1; 285/124.2; 285/124.4; 285/136.1; 285/141.1; 285/189; 285/332

(58) Field of Classification Search ............. 285/124.1, 285/124.2, 124.3, 124.4, 124.5, 141.1, 332, 285/332.1, 332.2, 332.3, 189, 137.11, 136.1, 285/137.1
See application file for complete search history.

(56) References Cited

U.S. PATENT DOCUMENTS 2,812,959 A * 11/1957 Fuller .................... 285/137.11

(Continued)

FOREIGN PATENT DOCUMENTS

WO    WO 99/63260 A1    12/1999

OTHER PUBLICATIONS

Reichle, et al., "A New Microsystem for Automated Electrorotation Measurements Using Laser Tweezers", BBA 1459:218-229 (2000).

(Continued)

*Primary Examiner*—James M Hewitt
*Assistant Examiner*—Jay R Ripley
(74) *Attorney, Agent, or Firm*—Caesar, Rivise, Bernstein, Cohen & Pokotilow, Ltd.

(57) ABSTRACT

A coupling device (100), particularly for liquid-tight coupling of at least one liquid line (10) to a fluidic system (20), is described, which comprises: at least one sealing device (30), which is implemented to receive an end region (11) of the liquid line (10) and has a first sealing surface (31) for placement on an external surface (22) of the fluidic system in such a way that the end of the liquid line (10) is laterally enclosed by the first sealing surface (31) and points toward an opening (23) in the external surface (22), and a clamping device (40), using which the sealing device (30) may be pressed against the fluidic system (20), so that the first sealing surface (31) produces a liquid-tight connection with the external surface (22).

17 Claims, 5 Drawing Sheets

U.S. PATENT DOCUMENTS

| | | | |
|---|---|---|---|
| 3,973,792 A | | 8/1976 | Gönner |
| 4,995,646 A | * | 2/1991 | Johnston et al. .......... 285/124.3 |
| 5,961,932 A | * | 10/1999 | Ghosh et al. ................ 422/193 |
| 6,056,331 A | | 5/2000 | Benett et al. |
| 6,077,015 A | * | 6/2000 | Leibman ..................... 411/418 |
| 6,209,928 B1 | | 4/2001 | Benett et al. |
| 6,267,143 B1 | * | 7/2001 | Schick ................. 137/625.11 |
| 6,273,478 B1 | | 8/2001 | Benett et al. |

OTHER PUBLICATIONS

Müller, et al., "A 3-D Microelectrode System for Handling and Caging Single Cells and Particles", Biosensors & Bioelectronics 14:247-256 (1999).

* cited by examiner

DEVICE AND METHOD FOR COUPLING LINES TO FLUIDIC MICROSYSTEMS

BACKGROUND OF THE INVENTION

The invention relates to devices for coupling liquid lines to fluidic microsystems, particularly a coupling device for liquid-tight coupling of at least one liquid line to a fluidic system, fluidic systems which are equipped with devices of this type, and methods for coupling lines to fluidic microsystems.

In biotechnology, analytics, medical research, diagnostics, and for pharmaceutical screening technologies, fluidic systems are used for handling suspended biological or synthetic samples. Miniaturized fluidic systems (micro-fluidic systems, fluidic microsystems), having typical dimensions of fluidic channels or compartments in the sub-millimeter range, are of special interest. Fluidic microsystems are particularly suitable for sample-specific single cell treatment or measurement and are equipped with microelectrode devices for this purpose if necessary. Typically, a fluidic microsystem is manufactured as a compact component (chip). The following technologies are known for charging the microsystems with the particular samples (e.g., biological cells, cell components, synthetic particles, and/or liquid media).

Firstly, receiving samples in pipette tips and applying them via tubing which is attached to the microsystem is known. Furthermore, continuously supplying microsystems with a transport or envelope stream into which the samples are introduced using pumps (e.g., syringe pumps, peristaltic pumps, piezoelectric pumps, and the like) is known. To attach tubing, providing permanent adhesive bonds, using plug-in adapters which are attached to the microsystem (see Reichle et al. "BBA", Vol. 1459, 2000, pp. 218-229), or producing an attachment using screw bushings are known.

Permanent attachment of tubing to microsystems is disadvantageous, since for most applications flexible adaptation of the microsystem to the sample supply and separate handling of the tubing and the microsystem, e.g., for cleaning purposes, is desired. The plug-in or screw connections, in contrast, have disadvantages for producing flow, since an undesired dead volume is formed at the location of a plug-in or screw adapter, at which the flow cross-section also changes in comparison to the attached tube.

The formation of a dead volume causes multiple problems. Firstly, quantitative sample introduction or quantitative sample removal is made more difficult or prevented at low cell counts and/or small sample volumes (e.g. <10 µl, <1000 cells/µl). The applications of conventional tube couplings are restricted to microsystems in which volumes in the higher µl to ml range may be accommodated as reservoir volumes and the flow speeds and volume flows are in the range >100 µl/hour and the speeds are in the range >500 µm/second and the retrieval rate of the sample assayed is not of overwhelming interest. However, this represents a significant restriction of the field of use of conventional microsystems. Furthermore, every dead volume is connected with extended pumping times. A tube having an internal diameter of approximately 250 µm has a volume of approximately 2 µl for 1 cm of tube length. At a desired flow speed of approximately 10 µl/hour, a dwell time of approximately 10 minutes results. With an equal dead volume, an undesired extension of the pumping time accordingly results. If multiple microsystems are coupled as required by an application, unacceptable process delays result.

It is especially critical that air bubbles may form or may adhere at substrate transitions and dead volumes. Particularly in the event of discontinuous operation ("stop and go"), these lead to non-reproducible pressure changes and thus to disadvantageous movement variations of the particles or cells in the microsystem.

The dead volume is usually also connected to a change of the flow cross-section, e.g., an expansion at a connection adapter. In the event of an expansion or accordingly after a narrowing, the flow speed is reduced. Samples or sample components may settle (sedimentation). For example, undesired loss of cells or a delay may occur until the cells are flushed further. Dead volumes therefore also generate a danger due to accumulation of impurities, through which susceptibility to microbes may arise.

A coupling device for microfluidic applications is known from WO 99/63260. A hollow body is fixed on a fluidic chip, in whose end pointing toward the fluidic chip an O-ring seal is integrated via an opening in the fluidic chip. For coupling, a liquid line having a profiled external wall is plugged into the hollow body having the O-ring seal. The free end of the liquid line is pushed toward the opening until the profiled external wall of the liquid line is seated in the O-ring seal. In this state, the O-ring seal is radially compressed in the hollow body, a liquid-tight connection being formed between the liquid line and the fluidic chip.

The coupling device according to WO 99/63260 has multiple disadvantages. Firstly, the coupling device is only usable with liquid lines having a profiled line end. The line end must be processed before use if necessary (e.g., by removing material or a heat treatment). A further disadvantage arises if, by plugging the end of the liquid line into the fluidic chip, a step arises in the particular opening of the fluidic chip because of the thickness of the wall material of the liquid line, through which the dead volume having the disadvantages described above is formed. Furthermore, it is problematic that the conventional technology is designed for relatively high operating pressures (e.g., 70 bar), which are impractical, however, in fluidic microsystem technology, in which fragile glass chips are used, for example.

An essential disadvantage is that according to WO 99/63260, a good seal is achieved between the liquid line and the radially clamped O-ring. However, there is only a relatively narrow contact surface between the O-ring and the fluidic chip, whose sealing function is fulfilled unreliably because of its small dimensions. In addition, the surface of the fluidic chip is loaded unevenly. High requirements are set on the stability of the fluidic chip. If correspondingly thicker wall materials are used, disadvantages result for the applicability of optical measurement methods to the fluidic chip.

The problems cited relate not only to the coupling of tubing, but rather also generally to other connections between liquid lines (e.g., capillaries) and fluidic microsystems.

Particularly if microsystems having small intrinsic volumes are used and/or for problems in cellular biology or medicine, the following requirements may arise. Small cell counts in the range from 1 to 500 cells are to be flushed through the microsystem with a retrieval rate >70% and are to be analyzed and manipulated therein according to different criteria (e.g., size, dielectric properties, optical properties, fluorescence properties). In this case, typical pumping speeds in the range from 100 to 500 µm/seconds or pump rates in the range from 2-20 µl/hour are to be implemented. Furthermore, it is desirable for specific applications to retrieve the cells quantitatively, possibly down to individual cells. For this purpose, applications exist for isolating clones originating from individual cells and for sample preparation for single cell technologies, such as single cell PCR, single cell CE, or the like, for example.

The object of the present invention is to provide improved devices for coupling liquid lines to fluidic microsystems, using which the disadvantages of conventional coupling technologies are overcome. The devices are particularly to be distinguished by an expanded field of application, high flexibility, and improved flow-technology properties, such as minimal dead volume and avoidance of steps in the flow cross-section. The object of the present invention is also to provide improved methods for coupling liquid lines to fluidic microsystems, particularly using devices of this type.

SUMMARY OF THE INVENTION

A basic idea of the present invention is to provide a coupling device for liquid-tight coupling of at least one liquid line to a fluidic system, particularly to a fluidic microsystems, which includes at least one sealing device, at which the liquid line ends and which has at least one bushing having a first planar sealing surface for resting on an outer surface of the fluidic system, through which the end of the liquid line points toward an opening in the outer surface, and at least one clamping device, using which the sealing device may be pressed against the fluidic system, so that the first sealing surface forms a liquid-tight connection with the outer surface of the fluidic system. Providing a sealing device having a sealing surface which radially encloses the end of the liquid line has the advantage that the liquid line may be coupled directly to the fluidic system without a dead volume. The liquid line opens directly into the microsystem without an intermediate adapter. The clamping device provides a detachable connection between the liquid line and the fluidic system which is advantageously suitable for sealing even at increased pressures, and thus allows high flow speeds even with small flow cross-sections, without the fluidic system being influenced by the mechanical contact pressure. The coupling device according to the present invention is distinguished by simplified handling. The liquid line equipped with the sealing device may be used for coupling to a fluidic system on its outer surface, the end of the liquid line being positioned over a selected opening in the outer surface and being fixed by simple actuation of the clamping device.

According to the present invention, the clamping device has at least one hollow plunger which is movable in relation to the outer surface of the fluidic system, so that through the movement toward the fluidic system, a force directed toward the outer surface of the fluidic system may be exerted on the at least one bushing of the sealing device. The at least one bushing of the sealing device has an external shape which is formed so that the desired force is exerted on the sealing surface under the effect of the hollow plunger.

According to a preferred embodiment of the present invention, the clamping device includes at least one hollow plunger which has at least one receptacle for at least one part of the bushing of the sealing device and possibly a front face, using which the sealing device may be pressed against the fluidic system. The use of a hollow plunger has the special advantage that the contact pressure for fixing the sealing device on the external surface of the fluidic system is distributed uniformly and may be selected as so low in relation to the sealing area that the fluidic system is not deformed or possibly destroyed. Furthermore, multiple liquid lines, which may be connected to one or more sealing devices, may advantageously be fixed, using multiple bushings, simultaneously and in a space-saving way using the particular associated hollow plungers.

The sealing device may be produced integrally with the end of the liquid line or permanently connected thereto (e.g., glued). According to preferred embodiments of the present invention, however, the liquid line and the sealing device form separate components which are detachable from one another and which may be reversibly connected to one another. For this purpose, the bushing of the sealing device has an internal hollow channel which is implemented to detachably receive an end region of the liquid line and forms a second sealing surface, the sealing device being able to be pressed on the end region of the liquid line using the clamping device, so that the second sealing surface forms a liquid-tight connection with the surface of the end region of the liquid line. In this design, the sealing device advantageously fulfills a double function. The end of the sealing line is sealed laterally (or radially) in relation to the outer surface of the fluidic system and corresponding to the alignment of the liquid line (or axially) along the surface of the liquid line. The additional advantage of expanded flexibility of the coupling device results with the detachable sealing device. The bushing may be plugged onto a tube end without problems and fixed on a fluidic system using the clamping device, particularly the hollow plunger. The length of the liquid line may be optimally tailored beforehand to the geometric conditions in the concrete application. Tube lengths may be reduced and pump times may thus be shortened.

According to a further preferred embodiment of the present invention, the hollow plunger of the clamping device forms a conical or cylindrical receptacle for the bushing of the sealing device, whose maximum internal diameter is smaller than the external diameter of the sealing device. A cylindrical receptacle has the advantage of uniform contact pressure of the sealing device on the end of the liquid line. Using the conical receptacle, the first and second sealing surfaces are advantageously sealed simultaneously when the clamping device is actuated.

According to a further preferred embodiment of the present invention, the at least one sealing device is equipped with multiple bushings, using which multiple liquid lines may be coupled to the fluidic system. The bushings may be connected to one another in one or more sealing units in rows or in a matrix. An advantage of this embodiment is simultaneous and parallel coupling of multiple liquid lines to the fluidic system.

It is advantageous, both in regard to the alignment of the liquid line in relation to the opening in the external surface of the microsystem and to coupling free of a dead volume, if the internal diameter of the liquid line is smaller than the diameter of the opening in the external surface of the fluidic system. The flow cross-section does expand in the region of the opening at the coupling, but cell losses due to settling, for example, may be prevented at this expansion through the design of the microsystem, e.g., through microelectrodes in proximity to the opening.

If the first sealing surface is larger than the cross-sectional area of the end of the liquid line, advantages may result for the seal even at low contact pressure of the clamping device.

A further subject of the present invention is a fluidic system which is equipped with at least one coupling device according to the present invention. The fluidic system has a chip body to which at least one liquid line is connected using the coupling device.

According to a preferred embodiment of the present invention, the chip body has an external surface which is planar in at least some sections, in which at least one opening is formed, the line end of the liquid line preferably being seated on the planar external surface. The dead volume of the coupling may thus advantageously be minimized. Since the line end of the liquid line preferably has the external shape of a circular cylinder, non-profiled tubes or capillaries may advantageously be used as liquid lines without additional processing steps. No special precision requirements must be placed on the external diameter of liquid lines.

Special advantages result if the fluidic system according to the present invention includes a fluidic microsystem. The requirements of fluidic microsystems in regard to careful mechanical handling and the possibility of measurements in the microsystem even in proximity to the coupled lines are optimally fulfilled by the combination with the coupling device according to the present invention.

A method for liquid-tight coupling of at least one liquid line to a fluidic system, particularly using a coupling device according to the present invention, is also a subject of the present invention. The method is distinguished by a sequence of steps in which at least one liquid line is coupled to the fluidic system using a sealing device and the clamping device, so that the end of the liquid line is aligned with an opening in the external surface of the fluidic system, a contact pressure being implemented at the clamping device in such a way that the sealing device forms the liquid-tight connection with the external surface of the fluidic system. The method according to the present invention has the advantage of simple and universal application for different types of liquid lines of interest in practice. Liquids, e.g., particle suspensions, are introduced into the microfluidic system without a dead volume, i.e., directly from the liquid line (hollow body).

The present invention has the following further advantages. The coupling device according to the present invention is easily employable by the user. Due to the planar design of the first sealing surface, a large contact area to the external surface of the fluidic system results, through which an optimum seal is achieved. This is correspondingly true for the part of the sealing device projecting into the clamping device, which ensures a large contact surface to the end region of the liquid line. The coupling device is distinguished by uniform pressure distribution and therefore a low mechanical load of the fluidic system, particularly a fluidic microsystem. The integrity is ensured even at increased internal pressures. A reliable seal is produced even at internal pressures of up to, for example, 0.1 MPa. Notwithstanding the sealing forces necessary for this purpose, the coupling device is detachable reversibly, easily (i.e., without a tool), and in a user-friendly way. The entire coupling device, parts thereof, or a composite of the coupling device and the lines may be manufactured as a disposable article or sterilized through a suitable method.

BRIEF DESCRIPTION OF SEVERAL VIEWS OF THE DRAWINGS

Further advantages and details of the present invention are described below with reference to the attached drawing.

DETAILED DESCRIPTION OF PREFERRED EMBODIMENTS OF THE INVENTION

The coupling device according to the present invention is described in the following for exemplary purposes with reference to embodiments which are set up for coupling flexible liquid lines (tubes) to a fluidic microsystem. The present invention is not restricted to the designs illustrated, but rather may also be implemented using altered liquid lines and fluidic systems. In general, a liquid line is a hollow body in which a liquid sample is positioned and which is set up to introduce the sample into the fluidic system. The liquid line may particularly be a tube, a capillary, a part of a syringe, or a connection to a reservoir of a microtitration plate or to a liquid conveyor device.

Figure 1:
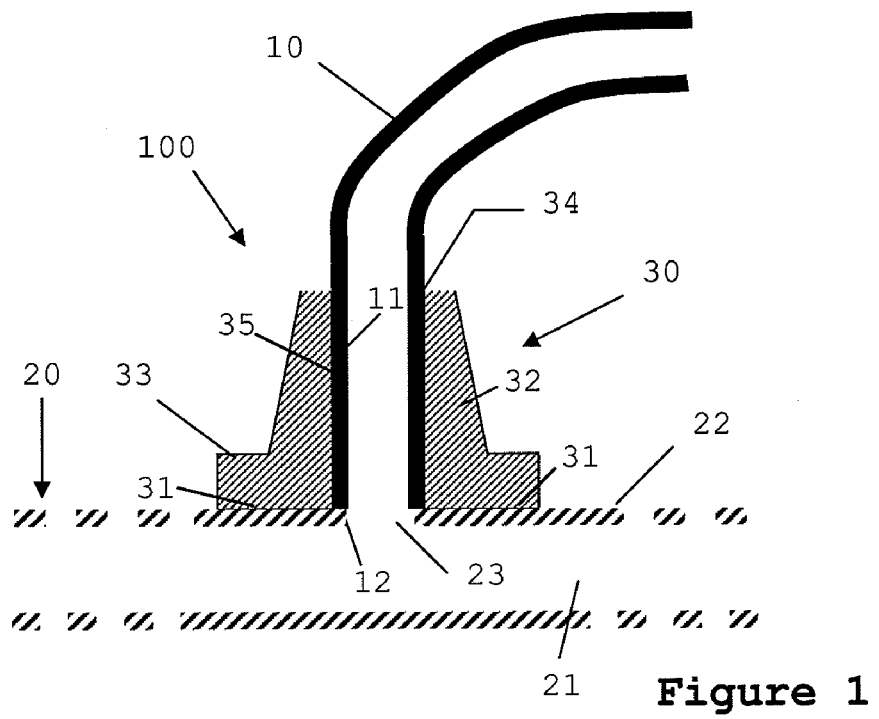
FIG. 1 shows a schematic sectional view of a sealing device according to a preferred embodiment of the coupling device according to the present invention.

FIG. 1 partially illustrates a first embodiment of the coupling device 100, which is set up for coupling a liquid line 10 to the microsystem 20 using a sealing device 30. FIG. 1 is a schematic illustration, the details and size ratios able to be varied in practice. The clamping device 40, which is part of the coupling device according to the present invention, has its function only shown in FIG. 2 for reasons of clarity. The liquid line 10 is, for example, a tube made of plastic, e.g., PTFE, PEEK, polypropylene, polyethylene, PVC, silicone, or a capillary made of glass, metal, or a metal alloy. The material is selected as a function of the application and is preferably inert in relation to the samples to be treated (cell compatible), sterilizable, and not very cell adhesive. The internal diameter of the liquid line 10 is, for example, approximately 250 µm. For cell biology applications, the internal diameter is preferably in the range from 120 µm to 200 µm or larger. The external diameter of the liquid line 10 is, for example, 1.6 mm.

Figure 2:
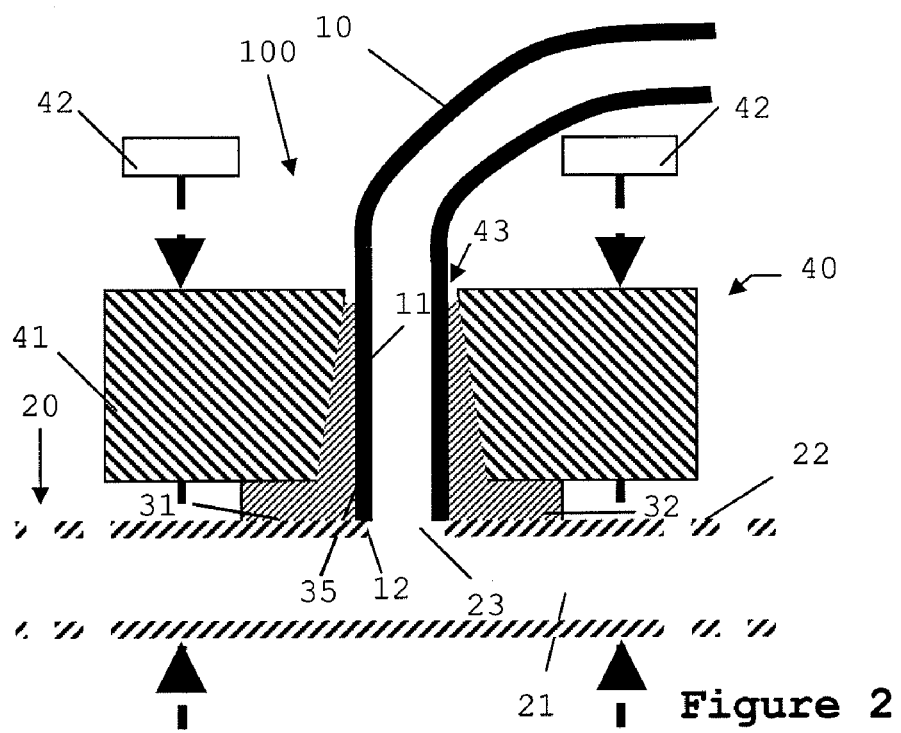
FIG. 2 shows a schematic illustration of the interaction of the sealing and clamping devices of the coupling device according to the present invention.

The microsystem 20, which is only partially shown schematically in FIGS. 1 and 2, is formed by a channel or compartment structure in a solid body (chip). The channels 21 of the microsystem have dimensions which are typically in the range from 5 to 1000 µm (width), 5 to 1000 µm (height), and 1 to 100 mm (length). Biological or synthetic samples, e.g., cells, cell components, macromolecules, plastic particles, or the like are analyzed, manipulated, separated, and/or microscopically evaluated in the microsystem (see Müller et al. in "Biosensors & Bioelectronics, Vol. 14, 1999, pp. 247-256). For cell biology applications, the dimensions of the channel 21 are, for example: 40 µm channel height, 200 to 800 µm channel width, 20 mm channel length. The microsystem 20 is, depending on its task, equipped in a way known per se with measurement and/or manipulation devices, particularly with a microelectrode device (not shown) for dielectrophoretic manipulation and/or measurement of particles. The microsystem is made, for example, of a semiconductor material (e.g. silicon), plastic, or glass, or a mixed composite of at least two of these materials.

The chip body of the microsystem 20 has an external surface 22 which is flat in at least some sections. Openings 23 are provided in the flat external surface 22 for connection to other microsystems or supply or discharge devices, through which the structure of the channels 21 or compartments may be accessed. The number and arrangement of openings 23 is selected as a function of the task while designing the microsystem. For example, in FIG. 1, a single opening 23 is shown which has a diameter of 500 µm, for example, and which is used for coupling a suspension sample from the liquid line 10 into the channel 21. In general, the opening forms an inlet or outlet in the wall of the fluidic system. In the surroundings of the opening or hole 23, the external surface 22 has a flat, smooth surface. The smooth surface is provided per se in most chip materials.

The sealing device 30 includes a conical bushing 32, on whose broader front face (bottom in FIG. 1) the first sealing surface 31 is formed. In the example shown, the bushing 32 has a lower projection 33. The first sealing surface 31 is enlarged by the projection 33 and an engagement surface for the clamping device 40 (see FIG. 2) is additionally provided. The projection 33 is, however, not a necessary feature of the present invention. The sealing function may also be formed by a simple conical bushing 32 or, with a suitable internal shape of the clamping device 40, by a bushing in the form of a straight cylinder. In general, the external shape of the bushing 32 and the internal shape of the clamping device 40 are produced so that a force may be exerted at least toward the external surface of the microsystem. The first sealing surface 31 has a dimension of at least 10 $mm^2$, preferably 20 $mm^2$.

The sealing device 30 is made of an elastic plastic material, such as silicone material, rubber, or another elastic plastic, which is preferably sterilizable, does not swell, and is biologically harmless. The material is preferably so soft that a seal is made possible in interaction with the clamping device, without deforming or destroying the chip body. It has a hardness in the range 30-50 Shore A, for example.

Preferably, materials are used which have a higher resistance to temperature, solvents (e.g., organic solvent such as ethanol), and non-ionic, anionic, and cationic surfactants, and/or which allow sterilization of the device through autoclaving (e.g., 20 minutes at 121° C. in pressurized water steam at 2 bar).

On the inside, the bushing 32 has a hollow channel 34, which is designed for removably receiving the end region 11 of the liquid line 10. The hollow channel 34 forms a second sealing surface 35, which represents a contact surface of the sealing device 30 with the end region 11. The conical second sealing surface 35 has a dimension of at least 10 $mm^2$, preferably 20 $mm^2$. The internal diameter of the hollow channel 34 is preferably selected so that it is at most as large as the external diameter of the end region 11, but is preferably slightly smaller.

To implement the liquid-tight coupling, the sealing device 30 is pressed onto the tubing 10 and to the microsystem 20 using the clamping device 40, as is schematically illustrated in FIG. 2. The clamping device 40 includes a hollow plunger 41, which may be pressed against the microsystem 20 using a schematically shown clamping mechanism 42. The bottom of the hollow plunger 41 is at a distance to the external surface 22. When the clamping mechanism 42 is actuated (a bayonet connection, for example, see FIG. 7) the distance of the hollow plunger 41 from the external surface 22 is reduced. The exertion of force connected therewith occurs perpendicularly to the external surface 22, as indicated by the arrows. The hollow plunger 41 forms a conical receptacle 43, whose internal shape is adapted to the external shape of the bushing 32. The contact surface between the internal and external shapes has a dimension of at least 10 $mm^2$, preferably 33 $mm^2$. When the hollow plunger 41 is pressed against the microsystem 20, the sealing material is compressed and the first and second sealing surfaces 31, 35 become liquid-tight. This state is illustrated in FIG. 2.

FIGS. 1 and 2 show, as a special advantage of the coupling device according to the present invention, that the end 12 of the liquid line 10 directly adjoins the opening 23 of the channel 21. Samples are transferred from the liquid line 10 into the channel 21 without a dead volume. The liquid line 10 discharges directly into the channel 21 without interposing adapters or the like.

The coupling according to the present invention using the coupling device 100 is performed according to one of the following procedures, depending on the application and construction of the clamping device 40. Firstly, it is possible to first insert the end region 11 of the liquid line 10 into the bushing 32 of the sealing device 30 and then push the sealing device 30 into the receptacle 43 of the clamping device 40. Subsequently, the clamping device 40 is positioned over the opening 23 with the sealing device and fixed on the microsystem 20. Alternatively, it is possible to first position the sealing device 30 with the liquid line 10 inserted over the opening 23 and then attach and tighten the clamping device 40 in order to produce the liquid-tight connection. Finally, the coupling device according to the present invention alternatively allows first only placing the sealing device 30 over the opening 23 with the clamping device 40, without pressing the clamping device 40 onto the microsystem 20, however. In this state, the end region 11 of the liquid line 10 may be pushed into the bushing 32 and the clamping device 40 may subsequently be tightened. This method is particularly advantageous if sealing units which are described below with reference to FIGS. 3 through 6 are used.

Figure 3:
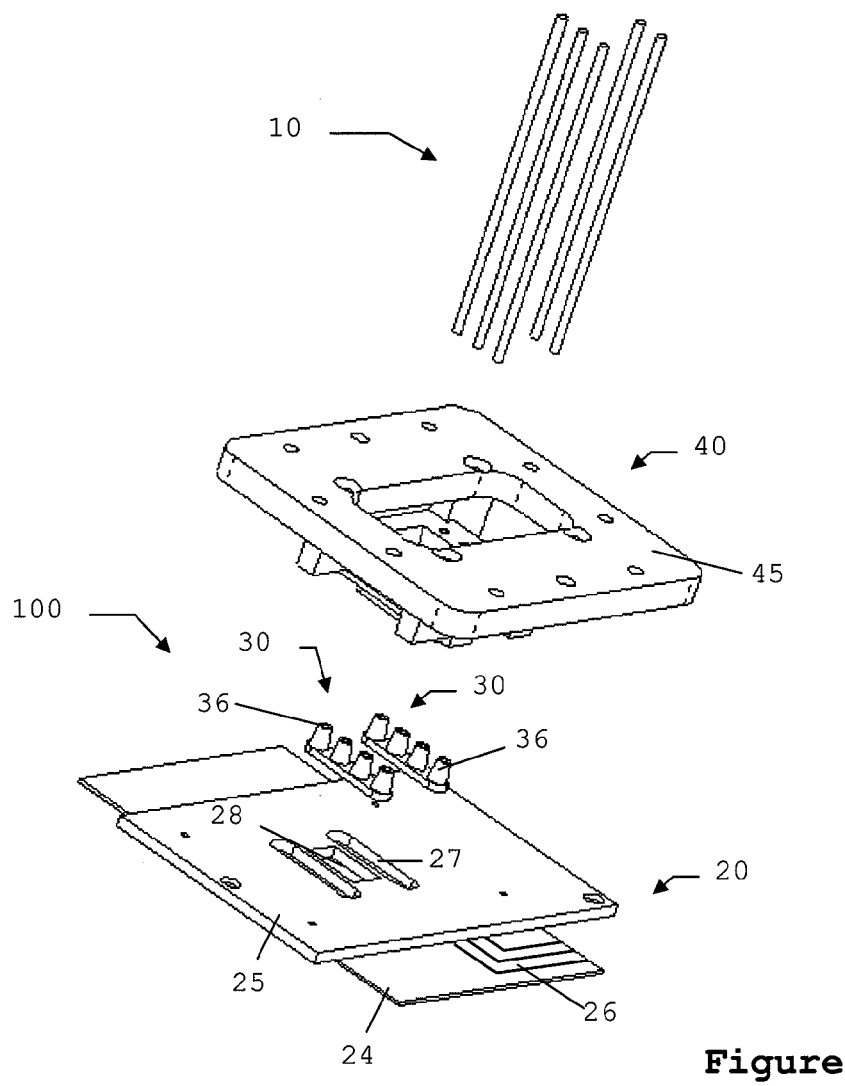
FIG. 3 shows a perspective view of an embodiment of the coupling device according to the present invention which is designed for coupling multiple liquid lines.

An altered embodiment of the coupling device 100 according to the present invention is shown disassembled in perspective in FIG. 3. In this design, multiple liquid lines 10 are coupled to a fluidic microsystem 22, two separate sealing units 36 being provided as sealing devices 30 and a fluidic block 45 being provided as the clamping device 40. One or more externally induced liquid flows are conducted into and/or out of the microfluidic system independently of one another using the liquid lines or hollow bodies 10.

The microsystem 20 includes the chip body 24, on which a holding plate 25 is placed. The chip body 24 contains the channel or compartment structure having a microelectrode device, from which electrical contacts 26 are guided to the edge of the chip body 24. The chip body 24 is made, for example, of a glass composite having multiple fluidic openings, each of which corresponds to the opening 23 in FIG. 1. For example, eight fluidic openings having a diameter of 500 μm each are provided. The holding plate 25 is provided on the top of the chip body 24 and has two recesses 27 each of which for receiving a sealing unit 36 and an observation window 28, through which the glass chip body 24 is exposed. It is a special advantage of the present invention that the coupling device has a sufficiently low overall height in the z direction (i.e., perpendicular to the upper external surface of the chip body 24) that the inside of the microsystem 20 may be imaged by an optical microscope. The adjustment of the optical components of the microscope is not obstructed by parts of the coupling device.

Figure 4:
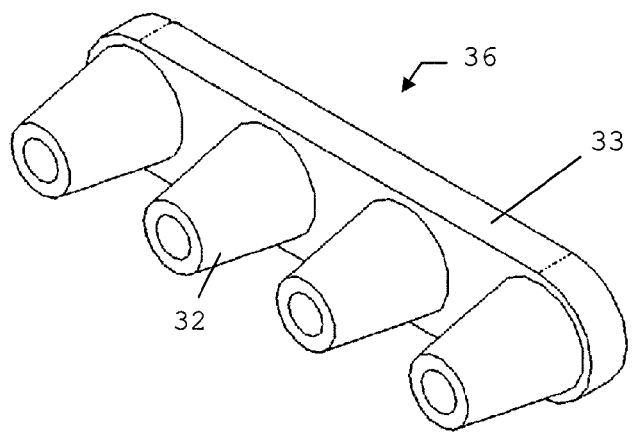
FIG. 4 shows a sealing unit of the coupling device according to FIG. 3.

Each sealing unit 36 which is shown enlarged in FIG. 4 includes four conical bushings 32, each of which is constructed analogously to the sealing device 30 shown in FIG. 1 and via which the continuous projections 33 are connected to one another in series. The continuous projections 33 form a sealing mat. The intervals of the sealing bushings 32 projecting out of the sealing mat into the sealing unit 36 precisely correspond to the intervals of the fluidic openings in the chip body 26. The sealing mat has the special advantage that the contact pressures generated by the clamping device are transmitted uniformly onto the external surface of the chip body 24.

Figure 5:
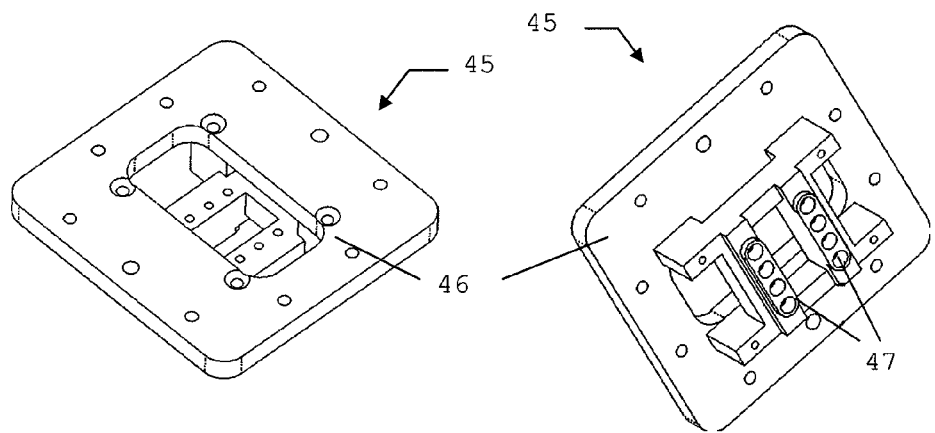
FIG. 5 shows two views of a clamping device of the coupling device according to FIG. 3.

The fluidic block 45, which is shown in greater detail on two sides in FIG. 5, fulfills the function of the clamping device 40. It includes a carrier plate 46, on whose side facing toward the microsystem 20 two rows of hollow plungers 47 are provided, which simultaneously form tube guides and receptacles for the sealing units 36. The fluidic block 45 is preferably made of metal, metal alloys, plastics, such as Teflon, PEEK, Kel-F, or ceramic.

The sealing units 36 are inserted into the hollow plunger rows 47 to couple the liquid lines 10 to the microsystem 20. This may be performed manually by exerting a slight pressure. The fluidic block 45 is subsequently placed on the microsystem 20. The bottoms of the sealing units 36 are received by the recesses 27 in the holding plate 25. The fluidic block 45 and the microsystem 20 are connected to one another by a mechanical structure (e.g., bayonet connection, see FIG. 7). Subsequently, the liquid lines 10 are inserted into the hollow channels of the sealing devices and the fluidic block 45 is pressed against the microsystem. The liquid-tight composite is advantageously produced simultaneously for all liquid lines. If one or more fluidic openings are not to be coupled to a line, massive filler bodies, e.g., in the form of rods, are inserted into the corresponding sealing devices.

Figure 6:
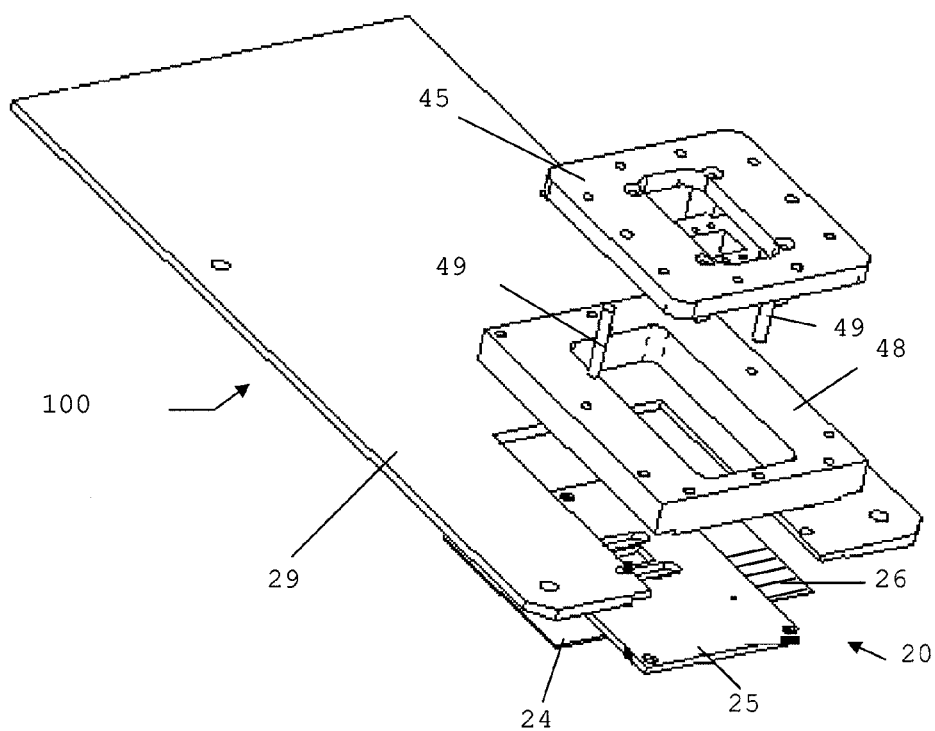
FIG. 6 shows an altered embodiment of the coupling device according to FIG. 3.

An altered construction of the coupling device according to FIG. 3 is illustrated in FIG. 6. In addition to the microsystem 20 having the chip body 24 and the holding plate 25, a chip carrier (pillar) 48 is shown, which interacts with the fluidic block 45. The reference number 29 refers to a circuit board adapter which interacts with the electrical contacts 26 of the chip body for electrical activation of the microsystem.

The construction shown in FIG. 6 is assembled as follows. The chip body 24 is connected to the holding plate 25 (e.g., glued). The holding plate 25 is used to increase the strength of the chip body and for cooling (heat sink). The holding plate 25 is screwed onto the chip carrier 48. It has two parallel oblong holes corresponding to the above-mentioned recesses 27, between which the observation window 28 is located. Guide pins 49 for aligning the fluidic block on the chip carrier 48 are located on the top of the chip carrier 48 and the bottom of the fluidic block 45. The sealing units 36 positioned between chip carrier 48 and chip body 24 fulfill two tasks, specifically receiving the liquid lines 10 and sealing the end sections of the liquid lines.

The microsystem 20 is set up for the purpose of analyzing, separating, and/or isolating molecules or particles in liquids. For example, microobjects, such as cells and artificial particles, typically in the order of magnitude of 2 µm to 100 µm, are to be analyzed, manipulated, pored, separated, and/or microscopically evaluated. The microsystem 20 forms a sorter, for example. For this purpose, the chip body contains at least one channel having a sorting device, as is known per se in fluidic microsystems. It is based, for example, on the dielectric separation of particles having different properties measured in the microsystem. A suspension having a particle mixture is introduced into the channel via a liquid line. For coupling, the sample is introduced accelerated by an envelope stream which has a flow speed of up to 2000 pl/seconds, for example. After the sorting, two partial streams are guided out of the microsystem, each of which is again accelerated using an envelope stream for accelerated coupling.

Figure 7:
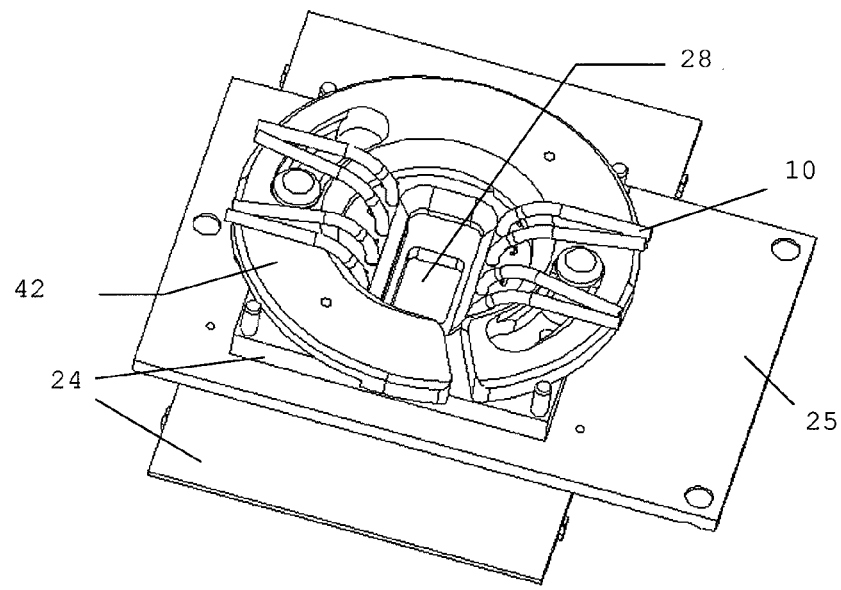
FIG. 7 shows a further altered embodiment of the coupling device according to FIG. 3.
Figure 8:
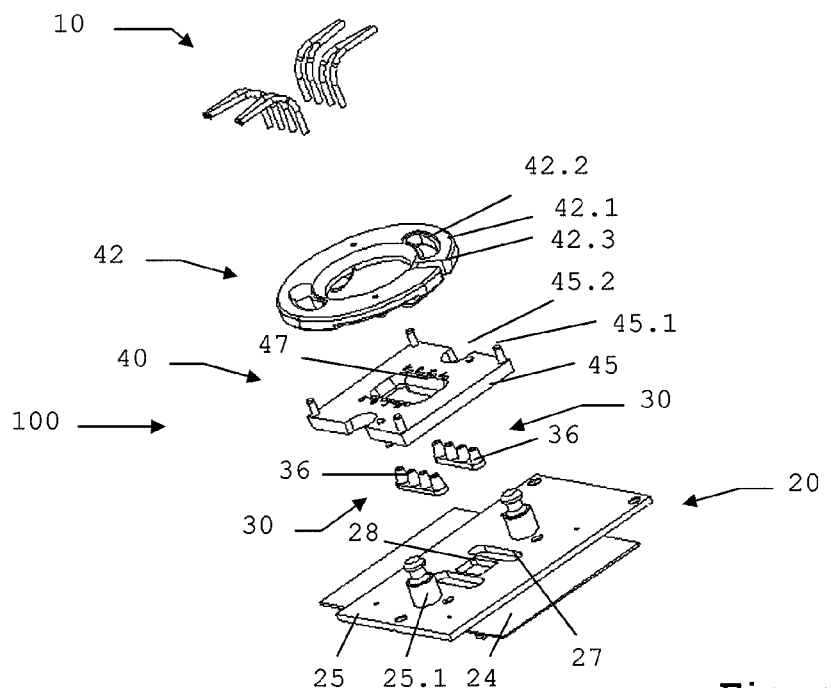
FIG. 8 shows an illustration of the parts of the coupling device according to FIG. 7.

A bayonet connection 42, through which the fluidic block 45 and the holding plate 25 are connected to one another, is shown in FIGS. 7 and 8 with reference to a further embodiment of the present invention. The bayonet connection 42 advantageously forms a coupling and the clamping mechanism schematically shown in FIG. 2 simultaneously, using which the distance between the cited components may be reduced and the contact pressure may thus be exerted.

The bayonet connection 42 includes a bayonet ring 42.1 having two anchoring ramps 42.2 and a slot 42.3. The slot 42.3 advantageously allows the bayonet ring 42.1 to be put on when the tubing 10 is already inserted into the sealing units 36 by an external auxiliary device (not shown, for example, a sample reservoir or pump). In this case, the tubing 10 is threaded through the slot 42.3 into the bayonet ring 42.1. The anchoring ramps 42.2 work together with two anchor pins 25.1 which project from the holding plate 25.

The fluidic block 45 is pressed against the fluidic chip 24 by the holding plate 25 when the bayonet connection 42 is locked. A flat spring (not shown) is advantageously provided between the bayonet ring 42.1 and the holding plate 25 for this purpose. Alternatively, the movement of the bayonet ring 42.1 toward the holding plate 25 may be set by the design of the anchoring ramps 42.2.

The fluidic block 45 is equipped in this embodiment with guide pins 45.1 which are used to guide and align the bayonet ring 42.1. The guide pins 45.1 include projections which are positioned at the corners of the surface of the fluidic block 45. Furthermore, the holding plate 45 is equipped with lateral openings 45.2, through which the anchor pins 25.1 of the holding plate 25 may project.

To assemble the coupling device shown in FIG. 7, the sealing units 36 are first placed in the recesses 27 of the holding plate 25 on the chip body 24 or the sealing units 36 are inserted into the hollow plunger rows 47 of the fluidic block 45 and the fluidic block 45 is then placed on the holding plate 25. Commercially available tubes are inserted into the addressed openings of the fluidic block. It is advantageously not necessary for specially equipped tubing having specific diameters or external shapes to be used. For example, tubing made of PTFE (external diameter 1/16") are provided. Finally, the bayonet ring 42.1 is placed and locked (by a half rotation, for example). The fluidic block 45 is pressed onto the chip body 24 by the locking motion and the desired sealing of the inserted tubing is thus achieved.

The embodiment of the present invention shown in FIGS. 7 and 8 has the following further advantages. The bayonet connection 42 may be handled easily. The fluidic block is reversibly attached to the chip, so that replacement of the tubing and the conical sealing mats in particular is made possible. The tubing and the chip do not require any special processing (grooves, etc.), in order to be sealed, and they may be plugged into the fluidic block while it is in place and do not have to be inserted before assembly. The breaking danger for the chip when the fluidic block is placed may be reduced to a minimum. Finally, the fluidic block is aligned by the guides mounted on the chip. Tilting of the fluidic block by twisting the bayonet closure is prevented by the guide pins.

Figure 9:
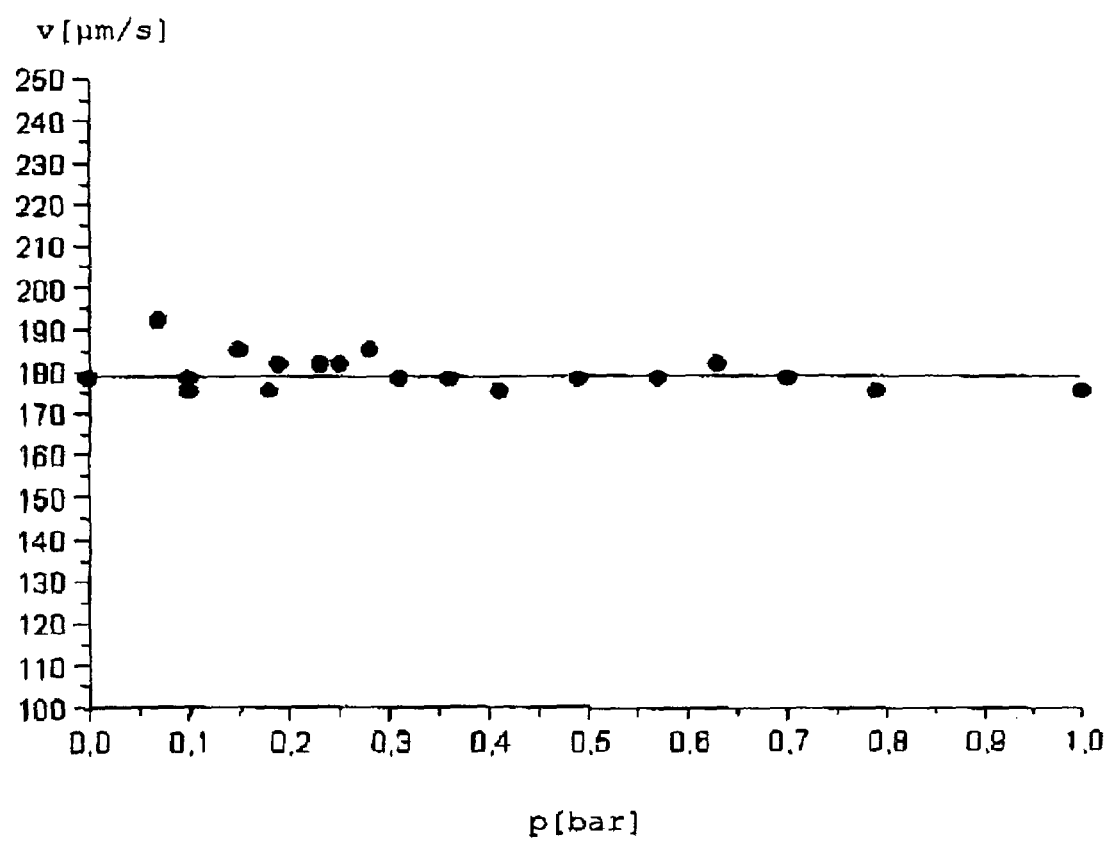
FIG. 9 shows a graph of test results which were obtained using a coupling device according to the present invention.

The result of the test of the coupling device according to the present invention is shown in FIG. 9. In the experiment, the speed in the channel of the microsystem was measured as a function of the pressure in an envelope stream container, using which the speed of the envelope stream is set. With increasing pressure, only a slight oscillation of the flow speed in the channel results. The flow in the channel is influenced negligibly by the elevation of the flow speed of the envelope stream. This confirms the high integrity of the coupling device according to the present invention. In contrast to this, in the test of a conventional coupling device having screw adapters, a strong dependence of the flow speed in the channel on the flow rate of the envelope stream is observed.

The features of the present invention disclosed in the above description, the drawing, and the claims may be significant for the implementation of the present invention in its various embodiments both individually and in combination.

What is claimed is:

1. A fluidic system having at least one liquid line and a coupling device for liquid-tight coupling the at least one liquid line to a surface of the fluidic system, said fluidic system coupling device comprising:
   at least one sealing device having at least one bushing receiving an end region of the at least one liquid line and having a first sealing surface in contact with an external surface of the fluidic system, an end of the at least one liquid line being laterally enclosed by the first sealing surface and pointing toward an opening in the external surface, and
   a clamping device having a fluidic block, a holding plate and at least one hollow plunger forming a receptacle for at least a part of the at least one bushing, wherein the clamping device presses the bushing onto the fluidic system without the clamping device contacting the fluidic system, so that the first sealing surface produces a liquid-tight connection with the external surface,
   wherein the at least one hollow plunger is situated so as to be movable in relation to the external surface, the at least one bushing has an external shape that is complementary to and interacts with an internal shape of the at least one hollow plunger of the clamping device in such a way that a force directed toward the external surface of the fluidic system is exerted on the at least one bushing using the at least one hollow plunger, and the at least one bushing has a projection forming the first sealing surface and an engagement surface for the clamping device,
   wherein the at least one bushing has an internal hollow channel removably receiving the end region of the at least one liquid line, the internal hollow channel forming a second sealing surface and the at least one sealing device being able to be pressed against the end region of the at least one liquid line using the hollow plunger in such a way that the second sealing surface produces a liquid-tight connection with the surface of the end region, and
   wherein the fluidic block is pressed onto the holding plate using a bayonet connector interengaging the holding plate.

2. The fluidic system according to claim 1, wherein the at least one hollow plunger forms a conical or a cylindrical receptacle for the at least one bushing.

3. The fluidic system according to claim 2, wherein the at least one bushing has a conical external shape.

4. The fluidic system according to claim 1, wherein the internal hollow channel has a cylindrical internal shape.

5. The fluidic system according to claim 1, wherein the first sealing surface is larger than a cross-sectional area of the end of the at least one liquid line.

6. The fluidic system according to claim 1, wherein said sealing device has multiple bushings, the multiple bushings forming at least one sealing unit and to couple multiple liquid lines to the fluidic system simultaneously.

7. The fluidic system according to claim 6, wherein the bushings of the sealing device are connected to one another in rows or in a matrix in the at least one sealing unit.

8. The fluidic system according to claim 7, wherein the at least one sealing unit forms a sealing mat, from which the bushings project.

9. The fluidic system according to claim 6, wherein the clamping device comprises a fluidic block and a plurality of hollow plungers, in which hollow plungers of said plurality of hollow plungers are formed in accordance with an arrangement of the bushings of the at least one sealing unit.

10. The fluidic system according to claim 6, further comprising a holding plate permanently connected with the fluidic system and arranged for positioning the at least one sealing unit on the fluidic system.

11. The fluidic system according to claim 1, comprising a chip body wherein the at least one liquid line is connected to the chip body by the coupling device.

12. The fluidic system according to claim 11, wherein the chip body is the external surface of the fluidic system, the external surface being planar at least in some sections and having at least one opening adjoined to a line end of the at least one liquid line.

13. The fluidic system according to claim 12, wherein the line end of the at least one liquid line has a cylindrical external shape.

14. The fluidic system according to claim 11, which comprises a fluidic microsystem.

15. A method for liquid-tight coupling of the at least one liquid line to the fluidic system using a coupling device according to claim 1, said method comprising:
   providing the coupling device,
   forming a composite of the at least one liquid line with one bushing of the at least one sealing device, respectively, the clamping device, and the fluidic system, and
   actuating the clamping device to produce a contact pressure on the projection of the bushing in such a way that the sealing device forms the liquid-tight connection with the external surface of the fluidic system.

16. The method according to claim 15, wherein, to form the composite, the end region of the at least one liquid line is plugged into a bushing of the at least one sealing device, which was previously positioned with the clamping device on the fluidic system, so that the end of the at least one liquid line points toward an opening in the external surface of the fluidic system.

17. The method according to claim 15, wherein, to form the composite, the end region of the at least one liquid line is plugged into a bushing of the sealing device, which is subsequently connected to the clamping device and positioned on the fluidic system, so that the end of the at least one liquid line points toward an opening in the external surface of the fluidic system.

* * * * *